United States Patent [19]

Russell

[11] Patent Number: 5,024,297
[45] Date of Patent: Jun. 18, 1991

[54] TORQUE TRANSMITTING BEAM FOR WHEEL HAVING BRAKE TORQUE DRIVES

[75] Inventor: Donald L. Russell, New Carlisle, Ohio

[73] Assignee: The B.F. Goodrich Company, Akron, Ohio

[21] Appl. No.: 352,786

[22] Filed: May 16, 1989

[51] Int. Cl.⁵ ............ F16D 55/36; F16D 65/12
[52] U.S. Cl. ................... 188/18 A; 188/71.5; 188/264 G; 192/70.2; 301/6 E; 301/6 WB
[58] Field of Search .............. 188/71.5, 18 A, 264 G; 192/702; 301/6 E, 6 D, 6 WB

[56] References Cited

U.S. PATENT DOCUMENTS

| 2,616,525 | 11/1952 | DuBois | 188/71.5 X |
|---|---|---|---|
| 3,010,543 | 11/1961 | Pear, Jr. | 188/71.5 |
| 3,061,050 | 10/1962 | Horn | 188/71.5 |
| 3,754,624 | 8/1973 | Eldred | 188/71.5 |
| 3,829,162 | 8/1974 | Stimson et al. | 301/6 E X |
| 3,887,041 | 6/1975 | Malone | 188/71.5 |
| 4,018,482 | 4/1977 | Rastogi . | |
| 4,131,321 | 12/1978 | Hall . | |
| 4,171,038 | 10/1929 | Sommer | 192/70.2 X |
| 4,585,096 | 4/1986 | Bok . | |

FOREIGN PATENT DOCUMENTS

| 174342 | 9/1901 | Fed. Rep. of Germany | 192/70.2 |
|---|---|---|---|
| 49138 | 3/1985 | Japan | 188/71.5 |

Primary Examiner—George A. Halvosa
Attorney, Agent, or Firm—David M. Ronyak

[57] ABSTRACT

An improved torque lug drive for a multidisc brake and wheel assembly having greater resistance to torque loading than earlier designs at lower weight. The torque transmitting beam is mechanically secured to the radially inner surface of the wheel rim adjacent the wheel rim flange, for example, by a threaded fastener. A shear pin transmits torque load from the torque beam to a boss provided on the radially inner surface of the rim at a point between the wheel rim flange and the web of the wheel.

22 Claims, 3 Drawing Sheets

TORQUE TRANSMITTING BEAM FOR WHEEL HAVING BRAKE TORQUE DRIVES

BACKGROUND OF THE INVENTION

This invention relates to multidisc type brakes or clutches and particularly to the torque transmitting drive lugs fastened to the radially inner surface of the rim of a wheel for engagement with brake rotors. Heretofore, such torque transmitting drive lugs have been mounted on the radially inner surface of the wheel rim and have been in the form of individual members extending axially along the radially inner surface of the wheel rim. These drive lugs have been attached to the radially inner surface of the wheel rim at its flange by a threaded fastener and at the opposite end by insertion of such end of the drive lug into an aperture formed in the web of the wheel adjacent to the rim. Problems with drive lugs of the type just described have included excessive deflection in operation due to high bending moments induced upon actuation of the brake. To overcome such high bending moments, it has been necessary to use relatively heavy drive lugs to provide the necessary strength and resistance to deflection induced by torque.

The following patents are exemplary of previous efforts in this field.

U.S. Pat. No. 4,131,321 to J. A. Hall discloses a torque lug drive system in which the drive lugs are mounted in a drum extending axially outwardly of the wheel. Annular ribs on the inside of the drum provide reinforcement of the drum and protection for the lugs. Additional axially extending ribs inside the drum provide further reinforcement of the drum which may be thin and lightweight because of the reinforcement.

U.S. Pat. No. 4,585,096 to L. D. Bok discloses a split disc for a brake or clutch. FIG. 1 illustrates a method of attachment of drive lugs for the rotor discs in which the inboard end of a drive lug is received in a bore in the wheel web and the outboard end of the drive lug is fastened by a bolt to the wheel rim.

U.S. Pat. No. 4,018,482 discloses a disc-type brake or clutch having torque transmitting members fastened to the wheel for engagement with rotors of the brake or clutch. The rim construction is provided with integral torque transmitting lugs, each of which is contoured to lower the maximum tensile stresses in the lugs and rim below the desired maximum stress level.

While many different approaches to provision of torque transmitting members fastened to or integral with a wheel rim have been proposed, there remains a desire to increase the maximum load which can be carried while minimizing the weight of the torque transmitting members and their attachment to the wheel rim.

SUMMARY OF THE INVENTION

According to an aspect of the present invention, there is provided a rim construction for a wheel and multidisc brake assembly in which the rim of said wheel is generally cylindrical and coaxial with the axis of said wheel and brake assembly and in which said rim has a radially inner surface extending from the rim flange chin to the web of the wheel configured to mechanically support at least one torque-transmitting beam extending radially inward from and axially across said inner surface, said radially inner surface including adjacent the wheel rim flange chin a first boss having a recess configured to receive one of a first spacer or said torque beam and a bolt assembly to secure said spacer and/or torque beam, and a second boss axially aligned with but distal from said first boss and proximal to a wheel web member, said second boss configured to receive one of a second spacer or torque beam and a substantially radially extending shear pin passing through an aperture in said second spacer and torque beam.

According to another aspect of the invention, there is provided a method of attachment of a torque-transmitting beam in a wheel and multidisc brake assembly in which the wheel includes a hub, a rim including a flange and a web member joining the hub and rim, the rim of said wheel is generally cylindrical and coaxial with the axis of rotation of said wheel and brake assembly comprising forming a first boss and a second boss spaced therefrom in a direction toward the web and axially aligned with said first boss on the radially inner surface of the rim, said first boss being positioned adjacent the rim flange, forming an axially extending channel-shaped recess in each of said bosses, providing a first spacer of a size and configuration corresponding to the recess in said first boss, providing a second spacer of a size and configuration corresponding to the recess in said second boss, providing a torque beam of a length sufficient to extend axially from said first boss to said second boss, the radially outer surface of said torque beam being configured to engage the radially inner surface of said spacers, securing the second spacer to the web end of the torque bar with a closely fitting shear pin, engaging the second spacer of the combined torque bar, shear pin and second spacer into the channel of said second boss and first spacer into the channel of said first boss and the flange end of the torque bar with said first spacer and securing the flange end and first spacer to the wheel rim chin by a closely fitted fastener such as a bolt.

According to a further aspect of the invention, there is provided a torque-transmitting beam assembly for use in wheel and multidisc brake assembly for engagement with a rotor of said multidisc brake assembly comprising a) an elongate torque-transmitting beam including a rim flange end and an inboard end, said beam having adjacent its rim flange end a first aperture and adjacent its inboard end a second aperture.

b) an inboard spacer having an aperture therethrough, and c) a shear pin having a shank extending through said second aperture of said torque-transmitting beam and the aperture of said spacer and securing said spacer to said torque-transmitting beam, said shear pin being closely fitted to the second aperture of the beam and the aperture of the spacer.

The accompanying drawings show one preferred form made in accordance with and embodying this invention and is representative of how this invention may be practiced.

DETAILED DESCRIPTION

Figure 1:
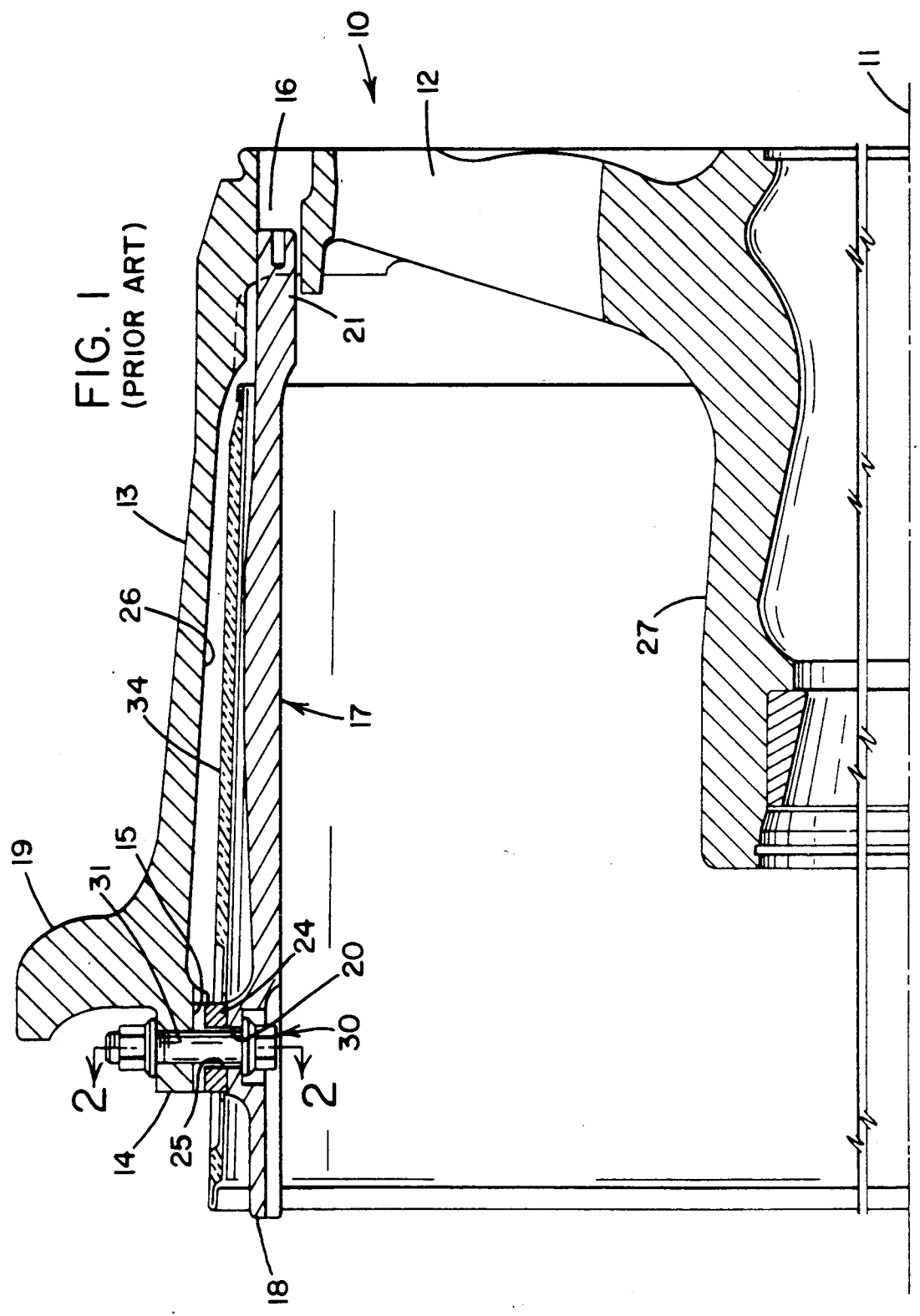
FIG. 1 is a fragmentary cross-sectional view of one half of an aircraft wheel and torque-transmitting beam assembly according to the prior art.
Figure 2:
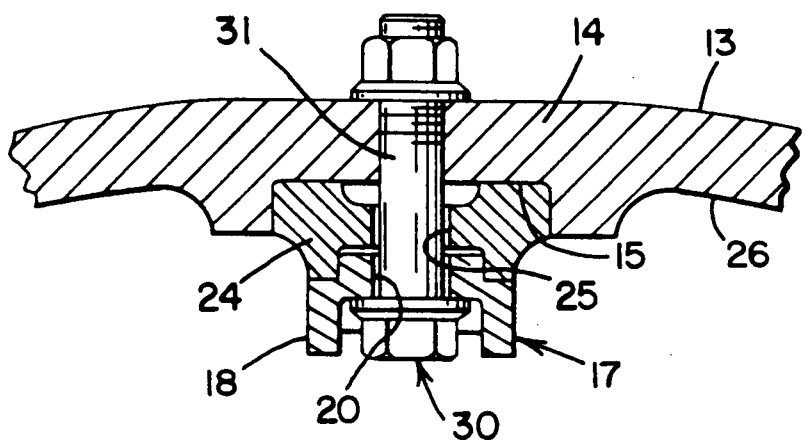
FIG. 2 is an enlarged fragmentary axial elevational sectional view taken along the plane of line 2—2 in FIG. 1.

In FIGS. 1 and 2 there is shown a prior art torque-transmitting bar 17 or drive lug or key and manner of attaching same to a wheel and rim construction. The construction shown in FIGS. 1 and 2 is similar to that shown and described in U.S. Pat. No. 4,585,096. According to the prior art embodiment shown in FIGS. 1 and 2, an inboard wheel half assembly 10 is configured for and is intended to be mounted upon an axle (not shown) for rotation about wheel rotational centerline 11. The inner half wheel assembly 10 is intended to be bolted to an outboard wheel half (not shown) for supporting a tire (not shown) on wheel rim 13. The wheel rim 13 is joined to the wheel hub 27 by generally radially extending wheel web 12. As shown in FIG. 1, wheel web 12 is provided with an annular recess 16 for receipt of inboard end 21 of torque bar 17. Typically, annular recess 16 and inboard end 21 of torque bar 17 are round. The opposite outboard end or flange end 18 of torque bar 17 is secured to the chin 14 of the wheel rim flange 19 by means of bolt and nut assembly 30. The flange end 18 of torque bar 17 does not bear directly on the radially inward surface of recess 15 provided in the wheel rim flange chin 14 but rather bears on spacer 24 which is configured for engagement with recess 15 to prevent relative movement therebetween. A heat shield 34 is mounted between torque bar 17 and the radially inner surface 26 of wheel rim 13. The aperture 20 provided for receipt of bolt and nut assembly 30 is generally liberally oversized relative to the diameter of the shank 31 of the bolt. In like manner, the aperture 25 in spacer 24 is oversized. The aperture in rim flange chin 14 may be oversized relative to the shank of bolt and nut assembly 30. Shear loading of the torque bar 17, which engages complementary slots or notches in the outer periphery of a plurality of brake rotors (not shown), is transferred to the wheel rim 13 through the axially extending side edges of the matingly configured boss and recess respectively of torque bar 17 and spacer 24 as shown in FIG. 2. The sides of spacer 24 bear against the sides of the axially extending recess in the boss provided on the radially inner surface 26 of the wheel rim flange chin 14. Nut and bolt assembly 30 merely provide a clamping load to affix the flange or inboard end 18 of the torque bar 17 to the wheel rim 13. Essentially all shearing load is transferred other than through the shank 31 of the nut and bolt assembly 30. In normal operation, the cylindrical surface of bolt shank 31 does not contact the sides of the aperture 20 in the flange end 18 of torque bar 17 or the aperture 25 in spacer 24.

THE INVENTION

Figure 4:
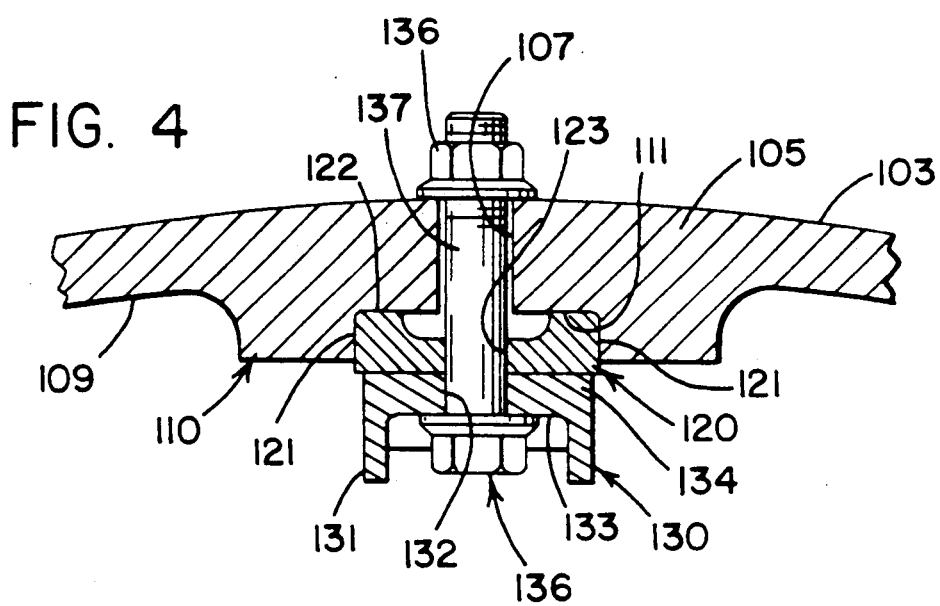
FIG. 4 is an enlarged fragmentary axial elevational sectional view taken along the plane of line 4—4 in FIG. 3.
Figure 5:
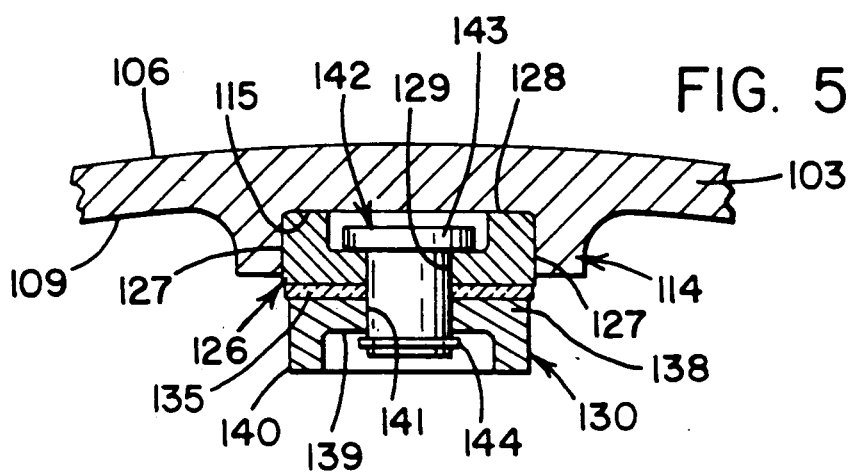
FIG. 5 is an enlarged fragmentary axial elevational sectional view taken along the plane of line 5—5 in FIG. 3.
Figure 3:
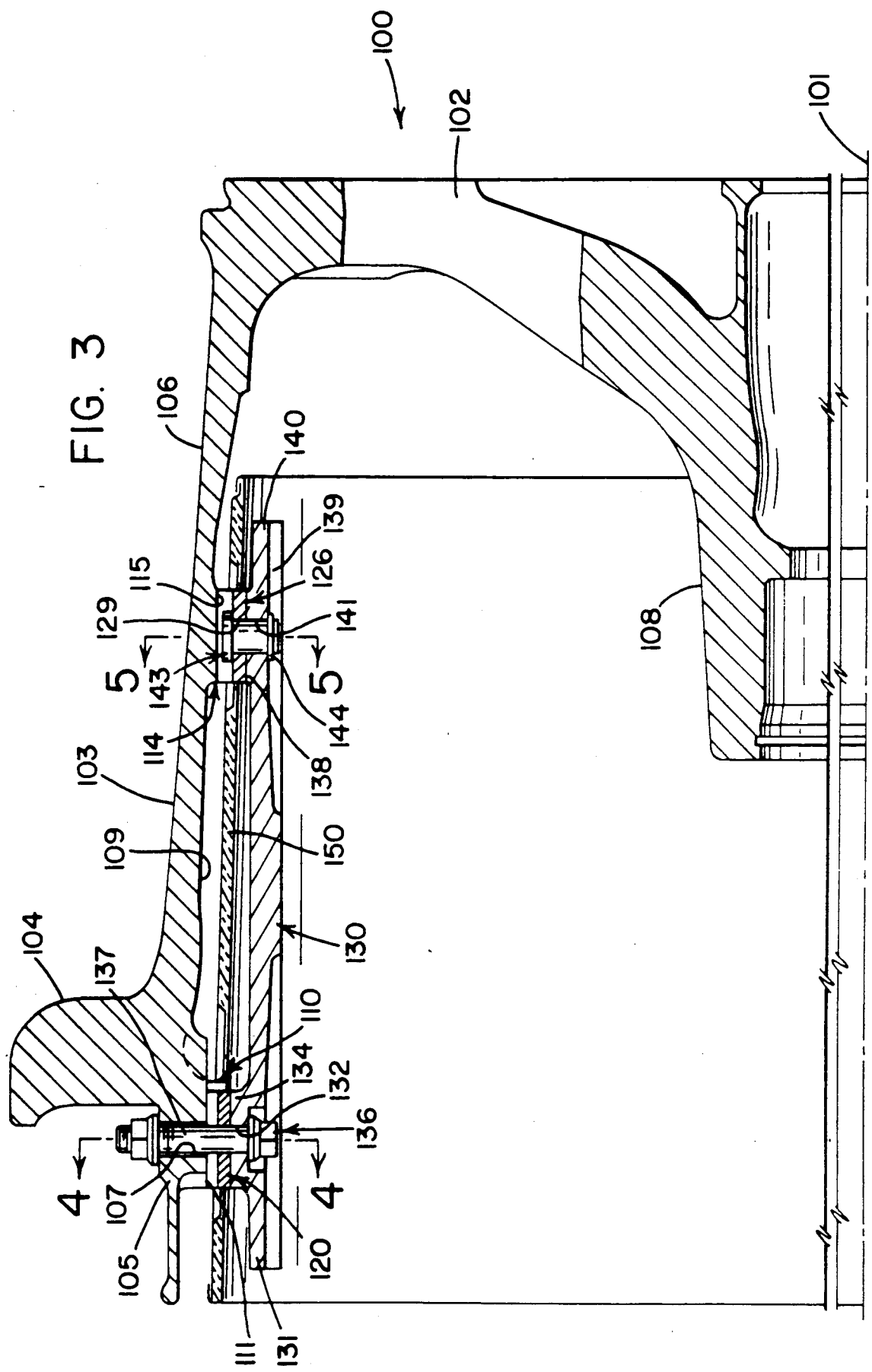
FIG. 3 is a fragmentary cross-sectional view of one half of an aircraft wheel and torque-transmitting beam assembly according to the invention.

Having reference to FIGS. 3, 4 and 5, there is shown a preferred embodiment of a torque-transmitting beam 130 and means of its attachment to the inner half wheel assembly 100 according to the invention. Inner half wheel assembly 100 is rotatable about axis 101. Half wheel assembly 100 includes a hub 108 which is connected by radially extending web 102 to generally axially extending wheel rim 103. The outboard end of wheel rim 103 includes a generally radially projecting wheel rim flange 104 and wheel rim flange chin 105. The radially inner surface 109 of wheel rim 103 is provided with a first boss 110 adjacent wheel flange chin 105. Axially aligned therewith, but located inboard toward the wheel web 102 is second boss 114. First boss 110 is provided with recess 111 for engagement with spacer 120 (see FIG. 4). The sides 121 and base 122 of spacer 120 engage corresponding surfaces of the recess 111 of first boss 110. Spacer 121 is provided with aperture 123.

The axially inboard second boss 114 is provided with recess 115 adapted to receive and engage spacer 126. The sides 127 and base 128 of spacer 126 engage corresponding surfaces of recess 115 (see FIG. 5).

Spacers 120 and 126 also serve to reduce heat transfer from the torque-transmitting beam 130 into wheel rim 103. A separate layer as shown in FIG. 5 of heat insulating material 135 may be positioned between the surfaces of beam 130 and spacers 120 and 126 that would otherwise be in direct contact or between the surfaces of spacers 120 and 126 and corresponding recesses 111 and 115 that would otherwise be in direct contact.

Torque-transmitting beam 130 extends axially from adjacent the rim flange chin 105 inboard toward the wheel web 102 but terminates short of wheel web 102. Adjacent the flange end 131 of torque beam 130 there is provided aperture 132. The bore diameter of aperture 132 closely corresponds to the outside diameter of the shank 137 of bolt and nut assembly 136. A recess is provided for receipt of the head of the bolt such that the head of the bolt does not protrude radially inwardly beyond the radially innermost surface plane defined by torque beam 130. In analogous manner, aperture 123 of spacer 120 has a bore diameter closely corresponding to the diameter of shank 137 of bolt and nut assembly 136. Torque beam 130 also includes a first boss 134 which surrounds aperture 132 and a second boss 138 which surrounds aperture 141. Bosses 134 and 138 project radially outwardly from the radially outward surface of torque beam 130.

Referring now to FIG. 5, there is shown details of the construction and method of attachment of the axially inboard or web end 140 of torque beam 130. Torque beam 130 adjacent its axially inboard or web end 140 is provided with a recess 139 and within the recess an aperture 141. The sides 127 and base 128 of spacer 126 engage corresponding surfaces of recess 115 formed within boss 114. Spacer 126 is provided with a recessed bore or aperture 129. Bores 141 of torque beam 130 and 129 of spacer 126 are aligned. Shear pin 142 extends through the aligned apertures 129 of spacer 126 and 141 of torque beam 140.

Shear pin 142 and spacer 126 are assembled to the web end 140 of torque beam 130 prior to attachment of torque beam 130 to the rim flange chin 105 by bolt and nut assembly 136. The head 143 of shear pin 142 resides in a recess or counterbore provided in the base 128 of spacer 126. The opposite end of shear pin 142 is provided with a circumferentially extending groove which is fitted with retainer clip 144.

Thus, prior to installation of the flange end 131 of torque beam 130 to the first boss 110 provided on the wheel rim flange chin 105 by means of bolt and nut assembly 136, shear pin 142 and retainer clip 144 serve to retain second spacer 126 in proper engagement with the inboard end 140 of torque beam 130. Upon completion of the assembly as shown in FIG. 3, because the head 143 of shear pin 142 is captured between the bottom of recess 115 of boss 114 and the recess or counterbore of spacer 126, accidental loss during service of retainer clip 144 will not reduce the shear load bearing capability of torque beam 130.

The diameter of the shank of shear pin 142 closely corresponds to the diameter of aperture 141 in web end 140 of torque beam 130 and the diameter of aperture 129 in spacer 126. Shear pin 142 bears against the walls of correspondingly configured apertures 129 in spacer 126 and 141 in torque beam 130 during transmission of torque loads generated during braking.

Use of the invention enables minimization of torque beam bending moment distributions for operational and required qualification test loads. Position of inboard boss 114 and spacer 126 and shear pin 142 can be optimized to minimize torque beam bending moment. This enables minimal weight for a given wheel and multidisc brake design.

The following tests were performed to demonstrate structural integrity of the torque-transmitting beam arrangement of the invention. A production torque bar and test fixture in which the torque bar and its mounting were as shown in FIGS. 1 and 2 was assembled and loaded into a Tinius-Olsen machine. A load bar was utilized to distribute load over the torque bar between end supports to emphasize loading of the end supports rather than bending of the torque bar. When such load bar is not employed, bending of the torque bar occurs at about 12,000 pounds load applied midway of supports. Bending of the end supports or of the torque bar occurred at about 23,000 pounds load. The load bar was a solid piece of steel of about 1 inch × about 1 inch × about 4 inches. The load was applied in a manner representing the shear loading encountered during transmission of torque through engagement with rotors of the multidisc brake (not shown) Refer to U.S. Pat. No. 4,585,096 for an example as to the manner of such engagement.

A duplicate production torque bar was modified by enlarging the existing rim flange chin bolt hole, thereby reducing the existing countersink and increasing bearing area on the bolt shank. The aforedescribed torque bar test fixture was modified by enlarging the bolt clearance hole to insure that the shank of the bolt did not transfer load directly into the aluminum fixture but indirectly through the sides of a first spacer which engaged the sides of the recess in the wheel rim flange boss. This modified hardware was assembled and loaded in the Tinius-Olsen machine. A load bar was employed to distribute the load over the bar between the end supports. This loading bar was employed to prevent bending failure of the torque bar, while still applying load to the end supports of the torque bar. The torque bar was loaded to 22,250 pounds without structural failure. This load resulted in bending of the bar but no failure at the wheel rim flange chin end of the torque bar. Loading of the end supports was approximately equal and representative of loadings experienced during the required structural torque test for the production torque bar. This test confirmed viability of the invention.

Another production torque bar for the same aircraft was modified as described above to permit its attachment at the wheel rim flange chin in accordance with the present invention. A second hole was provided in the bar for engagement with a shear pin adjacent the inboard or web end of the torque bar. A new test fixture was fabricated representing the method of attachment shown in FIGS. 3, 4 and 5. A second spacer was made similar to that used in the second test but slightly thicker than that employed at the rim flange ohin to maintain proper alignment of the torque bar in the test fixture. A bolt was installed through the second spacer and the inboard end of the torque bar. This inboard bolt was installed without a nut and, thus, represented shear pin 142. The new test fixture and modified torque bar was loaded in the Tinius-Olsen machine. A loading bar was applied to the modified torque bar between the rim flange chin and inboard supports. The load was increased to 29,050 pounds at which point the aluminum test fixture failed. Failure was analogous to shearing of one of the sides of the second boss 114 shown in FIG. 5. Very little bending occurred in the torque bar and its supporting bolts.

Due to the temperatures expected when used in an aircraft having a plurality of carbon/carbon brake discs in its heat sink, bolt and nut assembly 136 is formed of Inconel TM alloy or the like. The shear pin 142, due to temperature requirements, is also formed of Inconel TM alloy or stainless steel or the like. Spacers 120 and 126 due to temperature and corrosion resistance requirements are formed of stainless steel.

The mounting arrangement of the present invention, when applied to certain aircraft enables a weight reduction of nearly 50% over the prior art concept for torque transmission between the wheel rim and the rotors of the brake. Each of the prior art configuration torque bars for that application weigh approximately 1.3 pounds. The net weight savings per such aircraft, upon employment of the invention, would be several pounds.

An additional disadvantage of the prior art concepts depicted in FIGS. 1 and 2 is the need for careful alignment and boring of the cylindrical hole 16 in the wheel web 12 for receipt of the inboard end 21 of the torque bar 17. Also, the annular recess 16 in wheel web 12 is susceptible to corrosion in service because the remaining half of the aircraft wheel (not shown) normally is not provided with a corresponding aperture to enable ventilation. In contrast, according to the invention, the recess 111 in first boss 110 and recess 115 in second boss 114 on the radially inner surface 109 of the rim flange may be machined in a single operation by use of a slotting or broaching machine. As a result, manufacturing costs of the wheel half 100 according to the invention are reduced when compared to the prior art, and corrosion problems due to entrapment of moisture are also reduced. Because the slotted recesses may be easily made open at their axial ends, ventilation is improved.

While a specific preferred embodiment of the invention has been described in detail, it would be apparent to people skilled in the art of aircraft wheel and rim construction and braking systems construction that other variations are possible which are obvious thereover. These variations are intended to be included bY the present specification and appended claims. For example, the torque-transmitting beam 130 could be provided with bosses 134 and 138 projecting a greater distance radially outwardly thereby eliminating the need for one or both of separate spacers 120 and 126. However, such a construction is believed less desirable than one including separate spacers where flexing of the torque beam is permitted by design. This is because such flexing of the directly mounted beam may cause the edges of the torque beam to gouge the sides of the recesses in bosses 110 and 114. Also such beams having integral extended bosses in lieu of separate spacers may be expected to have higher heat transfer rates into the wheel. To offset this effect, a separate heat insulating layer may be employed between the surfaces of the bosses and recesses that would otherwise be in direct contact.

What is claimed is:

1. A rim construction for a wheel and multidisc brake assembly, the wheel including a web, the rim of said wheel being generally cylindrical and coaxial with the axis of said wheel and brake assembly, said rim having a rim flange and a chin adjacent the rim flange and a radially inner surface extending from the rim flange chin to the web of the wheel configured to mechanically support at least one torque-transmitting beam extending radially inward from and axially partially across said inner surface, said radially inner surface including adjacent the wheel rim flange chin a first boss projecting radially inwardly relative to the surrounding radially inner surface of the rim and having a recess receiving a first spacer associated with said torque beam and a bore receiving a bolt assembly securing said first spacer and torque beam to the rim, and a discretely isolated second boss projecting radially inwardly relative to the surrounding radially inner surface of the rim and axially aligned with but distal from said first boss and proximal to a wheel web member, said second boss receiving a second spacer associated with said torque beam, said second spacer and torque beam having aligned apertures receiving a substantially radially extending shear pin passing through said aligned apertures in said second spacer and torque beam but not into said rim, said pin being the primary means of transferring torque-transmitting force applied to the beam into the second boss of the wheel rim.

2. The rim construction of claim 1 wherein the recess in the first boss is located in a radially inner face with the bore extending radially through said rim flange chin and said second boss has a recess in a radially inner face.

3. The rim construction of claim 2 wherein the first and second bosses are open at their axial ends.

4. The rim construction of claim 1 wherein the first spacer corresponds in size and configuration to said recess of said first boss and has an aperture extending radially therethrough, the second spacer corresponds in size and configuration to said recess of said second boss, the torque beam extending axially across and engaging said first and second spacers, said torque beam including a first aperture corresponding in size and aligned with the aperture of said first spacer, the bolt assembly fitted through said rim flange bore, first spacer aperture and first torque beam aperture, said bolt assembly including a shank closely fitted diametrically to said first spacer aperture and first torque beam aperture, and the shear pin captively and closely fitted diametrically through said second spacer and said second torque beam aperture.

5. The rim construction of claim 4 wherein the shear pin includes a head of greater diameter than its shank and the head is positioned adjacent the radially inner surface of the rim and the opposite end of the sheer pin includes retention means to prevent withdrawal of said shear pin.

6. The rim construction of claim 4 wherein the torque beam is configured such that no portion of the bolt assembly or shear pin protrudes radially inwardly beyond the radially innermost surface of the torque beam.

7. The rim construction of claim 4 wherein at least one of the said first or said second spacers is C-shaped in cross-sectional configuration.

8. The rim construction of claim 4 wherein a heat inslulating layer is positioned between a radially inner surface of the recesses of at least one of said first rim boss and said second rim boss and a radially outer surface of said torque beam.

9. The rim construction of claim 4 further including a heat shield positioned between the radially inner surface of the rim and the torque beam.

10. The rim construction of claim 4 wherein said torque beam has a flat radially outer surface and at least one of said first and second spacers has a flat radially inner surface.

11. The rim construction of claim 1 wherein a heat insulating layer is positioned between a radially inner surface of at least one of said first boss and said second boss and a radially outer surface of said torque beam.

12. A method of attachment of a torque-transmitting beam in a wheel and multidisc brake assembly in which the wheel includes a hub, a rim including a flange and a web member joining the hub and rim, the rim of the wheel being generally cylindrical and coaxial with the axis of rotation of said wheel and brake assembly, the method comprising forming a first rim boss and a discrete non-circumferentially continuous second rim boss spaced axially therefrom in a direction toward the web and axially aligned with said first rim boss on the radially inner surface of the rim, said first rim boss being positioned adjacent the rim flange, forming an axially extending channel-shaped recess in each of said rim bosses, providing a first spacer of a size and configuration corresponding to the recess in said first rim boss, the first spacer having an aperture extending radially therethrough, providing a second spacer of a size and configuration corresponding to the recess in said second rim boss, the second spacer having an aperture extending radially therethrough, providing a torque beam of a length sufficient to extend axially from said first rim boss to said second rim boss but terminating short of the wheel web member, the torque beam including a first aperture corresponding in size and alignable with the aperture of the first upper spacer and a second aperture corresponding in size and alignable with the aperture of the second spacer, the radially outer surface of said torque beam being configured to engage the radially inner surface of said spacers, securing the radially inner surface of the second spacer to the radially outer surface of the web end of the torque beam with a diametrically closely fitting shear pin which extends through the aperture of the second spacer and the second aperture of the torque beam, engaging the second spacer of the combined torque beam, shear pin and second spacer into the channel of said second rim boss, the shear pin not secured to the wheel rim, and engaging the first spacer into the channel of said first rim boss and the flange end of the torque beam with said first spacer and securing the flange end and first spacer to the wheel rim chin with a closely fitted threaded fastener, wherein wheel braking torque load imposed on the web end of the beam is transferred to the wheel primarily through shear loading of said pin.

13. The method of claim 12 further comprising forming the radially outer surface of said torque beam with a first boss and a second boss spaced apart an amount corresponding to the spacing of said first and second rim bosses, and forming the radially inner surface of each of said spacers with corresponding flat surfaces which engage the radially outer surface of said first and second torque beam bosses.

14. A torque-transmitting beam assembly for engagement with a rotor of said multidisc brake and wheel assembly in which the wheel includes a hub and a rim including an outboard flange and axially spaced therefrom an inboard web member joining the hub and the rim, the rim of the wheel being generally cylindrical and coaxial with the axis of rotation of said wheel and brake assembly, the rim including a chin adjacent the rim flange and a radially inner surface extending from the rim flange chin to the web of the wheel configured to mechanically support at least one torque-transmitting beam extending radially inwardly from and axially partially across said inner surface, said radially inner surface including proximate the wheel rim flang chin a first boss projecting radially inwardly relative to the surrounding radially inner surface of the rim and having a recess configured to receive a first spacer associated with said torque beam and a bore configured to receive a fastener assembly to secure said spacer and torque beam to the rim, said radially inner surface further including a discretely isolated second boss projecting radially inwardly relative to the surrounding radially inner surface of the rim and axially aligned with but distal from said first boss toward said inboard web member, said second boss configured to receive an inboard spacer associated with said torque beam, the beam assembly comprising
  a) an elongate torque-transmitting beam of length sufficient to span between the first and second rim bosses but insufficient to span between the first rim boss and engage the web member, the beam including a rim flange end and an inboard end, said beam having adjacent its rim flange end a first aperture adapted to receive a fastener to secure the rim flange end of the beam to the rim flange chin and adjacent its inboard end a second aperture,
  b) an inboard spacer having an aperture therethrough, and
  c) a shear pin of length corresponding to the combined thickness of the inboard end of the beam and spacer, the pin having a shank extending through said second aperture of said torque-transmitting beam and the aperture of said inboard spacer and securing said inboard spacer to said torque-transmitting beam but not to the wheel rim, said sheer pin being closely fitted to the second aperture of the beam and the aperture of the spacer, said pin being the primary means of transferring any braking torque load placed on the inboard end of the torque-transmitting beam to the inboard spacer.

15. The beam assembly of claim 14 wherein the shear pin includes a head of greater diametric size than its shank, which head contacts said spacer.

16. The beam assembly of claim 14 wherein the shear pin shank and second aperture of the torque-transmitting beam and aperture of said spacer are cylindrical, the pin includes a head of greater size than its shank and the spacer includes a recessed surface which is in contact with the head of the pin.

17. The beam assembly of claim 16 wherein the pin further includes a means adjacent the end of its shank distal the head, for retaining the pin from being withdrawn from the second aperture of the torque-transmitting beam.

18. The beam assembly of claim 17 wherein the beam includes a first boss surrounding said first aperture and a second boss surrounding said second aperture, the spacer contacting said beam's second boss, said beam's first boss being on the same surface of the beam as said second boss.

19. The beam assembly of claim 18 further comprising a layer of heat insulating material interposed between said spacer and said beam's second boss.

20. The beam assembly of claim 14 further comprising a layer of heat insulating material surrounding at least one of said apertures.

21. The beam assembly of claim 14 further comprising a layer of heat insulating material interposed between said inboard spacer and said torque-transmitting beam.

22. The beam assembly of claim 14 wherein the torque-transmitting beam has a flat radially outer surface and the spacer has a flat surface engaged therewith.

* * * * *